(12) United States Patent
King et al.

(10) Patent No.: US 7,866,425 B2
(45) Date of Patent: Jan. 11, 2011

(54) HYBRID ELECTRIC PROPULSION SYSTEM AND METHOD

(75) Inventors: Robert Dean King, Schenectady, NY (US); Dongwoo Song, Latham, NY (US); Lembit Salasoo, Schenectady, NY (US); Ajith Kuttannair Kumar, Erie, PA (US)

(73) Assignee: General Electric Company, Niskayuna, NY (US)

( * ) Notice: Subject to any disclaimer, the term of this patent is extended or adjusted under 35 U.S.C. 154(b) by 57 days.

(21) Appl. No.: 10/878,177

(22) Filed: Jun. 28, 2004

(65) Prior Publication Data
US 2005/0284676 A1    Dec. 29, 2005

(51) Int. Cl.
*B60K 1/04* (2006.01)
(52) U.S. Cl. .................................. 180/65.31; 903/951
(58) Field of Classification Search ................ 180/65.2, 180/65.3, 65.4, 65.31; 903/941, 951
See application file for complete search history.

(56) References Cited

U.S. PATENT DOCUMENTS

| | | | |
|---|---|---|---|
| 5,318,142 A * | 6/1994 | Bates et al. ................ | 180/65.2 |
| 5,428,274 A * | 6/1995 | Furutani et al. ............. | 318/139 |
| 5,589,743 A | 12/1996 | King ........................... | 318/139 |
| 5,659,240 A * | 8/1997 | King ........................... | 320/134 |
| 5,723,956 A | 3/1998 | King et al. ................... | 318/139 |
| 5,898,282 A | 4/1999 | Drozdz et al. | |
| 6,308,639 B1 | 10/2001 | Donnelly et al. ............. | 105/50 |
| 6,331,365 B1 * | 12/2001 | King ........................... | 429/9 |
| 6,476,571 B1 * | 11/2002 | Sasaki ......................... | 318/139 |
| 2003/0094816 A1 | 5/2003 | Kazama | |
| 2003/0117113 A1 * | 6/2003 | Takemasa et al. ........... | 320/150 |
| 2003/0233959 A1 | 12/2003 | Kumar | |

FOREIGN PATENT DOCUMENTS

EP          1229636          8/2002

* cited by examiner

*Primary Examiner*—J. Allen Shriver, II
*Assistant Examiner*—John D Walters
(74) *Attorney, Agent, or Firm*—Fletcher Yoder, PC

(57) ABSTRACT

A hybrid prolusion system comprising a first energy storage unit operable to supply power to a traction drive motor. A second energy storage unit is coupled with the first energy storage unit to provide additional power on demand to the traction drive motor. An auxiliary power unit (APU) is used to charge the first battery to maintain a desired voltage across the first energy storage unit.

34 Claims, 3 Drawing Sheets

HYBRID ELECTRIC PROPULSION SYSTEM AND METHOD

BACKGROUND

The invention relates in general to hybrid propulsion systems, and in particular to systems and methods for operating a series hybrid electric propulsion system with an auxiliary power unit.

Some vehicles use electric traction motors to propel the vehicle. Typically, the electric traction motors are connected to a link, such as a bus, that provides the motors with power. One or more on-board alternators may be used to provide the power to the link. In certain operating conditions, such as when the vehicle is decelerating or is maintaining speed on a downhill grade, the back-emf produced by the electric motors is greater than the voltage provided by the engine-driven alternator. Under such conditions, the electric traction motors cease acting as motors and become generators. This process, known as dynamic braking, is a form of electric braking that is used to reduce wear on the mechanical brake system components of a vehicle. In the case where the vehicle is a locomotive, dynamic braking reduces brake wear on the locomotive and also all of the rail cars of the train. Typically, a resistor is used to dissipate the electric power as heat produced by the electric motor during dynamic braking.

As a result, hybrid propulsion systems have been developed to recover some of the energy that is typically wasted as heat during dynamic braking. The recovery of this wasted energy is known as regenerative braking. Numerous configurations for hybrid propulsion systems for vehicles are known in the art. Generally, such propulsion systems utilize two different energy sources: a heat engine and a traction battery or other energy storage unit. The heat engine may include any engine that burns a fuel to produce mechanical work, such as an internal combustion engine, a turbine engine, a diesel engine, etc. The energy storage unit may include an electrically re-chargeable battery, an ultracapacitor, or a flywheel having a high power density. Hybrid systems are advantageous due to their ability to increase the fuel efficiency of the propulsion system and to reduce air pollution.

Heavy duty vehicles, such as transit buses, trucks, locomotives and off-highway vehicles generally utilize a series hybrid propulsion system, wherein the final drive to a vehicle axle comprises an electrical drive system. Conventionally, a series hybrid propulsion system typically includes an on-board energy source, such as a heat engine, coupled to an alternator that converts the mechanical output of the heat engine into an alternating current (AC). A rectifier is generally used to convert the AC output of the alternator into a direct current (DC). A portion of the DC output of the rectifier is used to charge an energy storage unit such as a traction battery, and a remaining portion is utilized to drive one or more electrical motors, such as a DC motor or an AC motor. Power output of the electrical motor(s) is transmitted to one or more vehicle axles via an electrical drive system.

During acceleration of the vehicle, or when the vehicle is climbing steep grades, the energy storage unit or traction battery is operating in a state of discharge, to augment electrical power output of the heat engine-alternator and thus provide high power levels for a period of time that depends on the rating of the energy storage unit. During braking, the energy storage unit or traction battery is operating in a state of re-charge to regeneratively capture a portion of the energy typically wasted during braking. The charge in the traction battery therefore needs to be optimally maintained to adequately provide for both modes: power discharge during acceleration and re-charge during regenerative braking. As described above, the charge in the traction battery in such systems is maintained by the on-board energy source.

In known series hybrid systems, the on-board energy source and associated controls are typically operated in a mode to control a state of charge in the energy storage unit or traction battery. One method of on-board energy source control is to operate the on-board energy source to maintain the traction battery's state of charge within a given range. In this approach, when a computed state of charge falls below a given set point, the on-board energy source is started and continues charging until the state of charge reaches an upper control limit. At this point, the on-board energy system control reduces the output power from the on-board energy source until recharging of the energy storage unit is stopped. One disadvantage with the above approach is that, in case the computed state of charge is in error, the on-board energy source may not properly charge the energy storage unit, leading either to an undercharge or an overcharge of the battery. These are both situations that will prematurely shorten the life of the energy storage system (traction battery) and may also cause a reduction in fuel economy.

There is, hence, a need to provide an improved control for the on-board power source, which is important to achieve high cycle life of the energy storage unit for economic viability.

BRIEF DESCRIPTION

In one aspect of the present technique, a hybrid propulsion system is provided. The system comprises a first energy storage unit, which may be used to supply power to operate a traction drive motor. A second energy storage unit, coupled with the first energy storage unit, may be used to supply additional power to the traction drive motor to supplement the first energy storage unit during an increase in demand. The system further comprises an auxiliary power unit, which may be used to maintain a desired voltage across the first energy storage unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques accordingly provide an improved control for charging electrically re-chargeable energy storage units used in hybrid prolusion systems for heavy-duty vehicles such as those mentioned earlier. As described in some detail hereinafter, the present techniques can be implemented to control charging of an electrical energy storage unit (or battery) by an auxiliary power unit in a battery-battery series hybrid propulsion system, as well as by an on-board energy source in a conventional series hybrid propulsion system.

Figure 1:
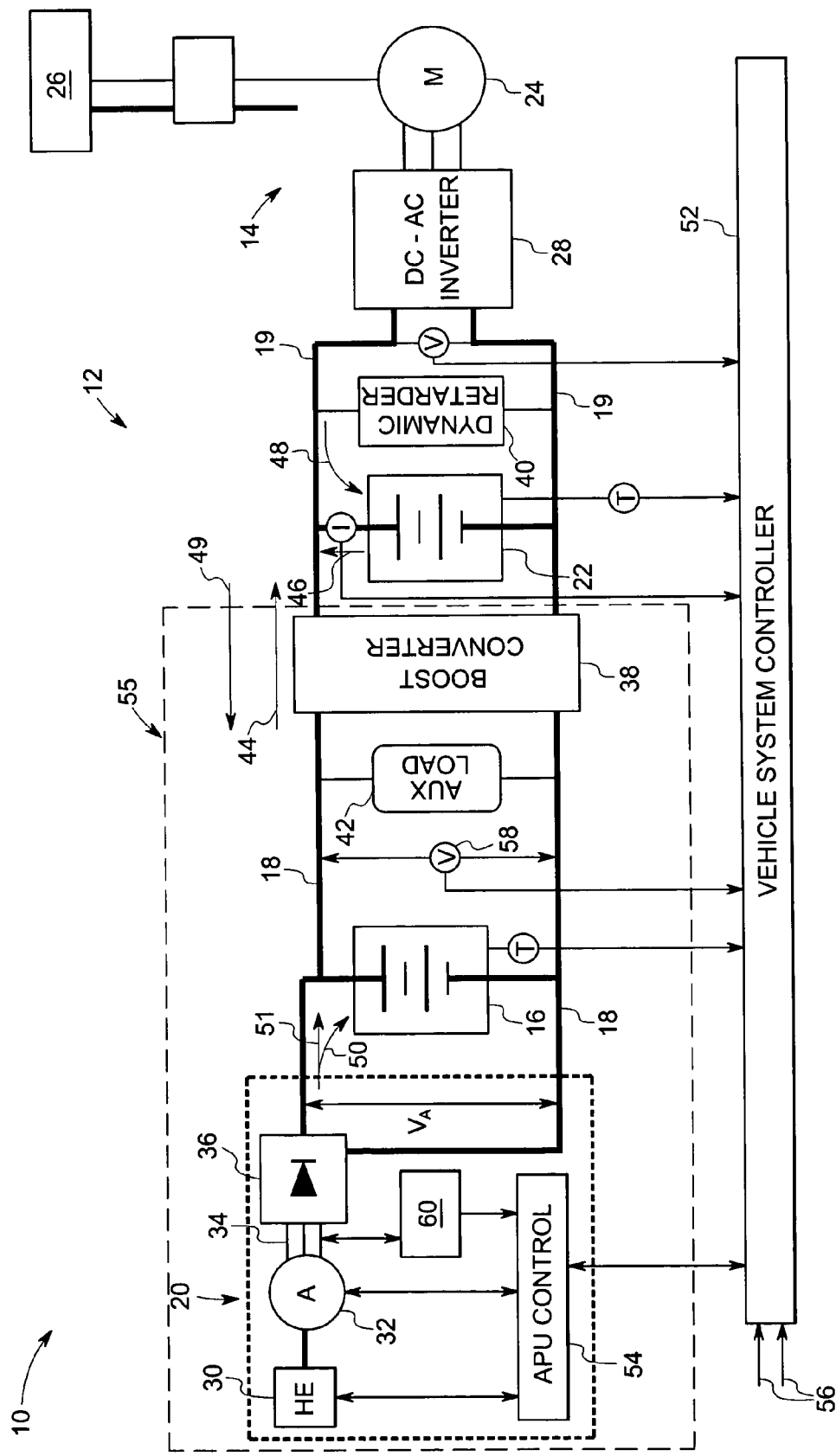
FIG. 1 is an electrical schematic of a hybrid propulsion system, in accordance with an exemplary embodiment of the present technique.

Referring now to FIG. 1, a hybrid propulsion system is illustrated, and represented generally by reference numeral 10. The illustrated configuration of the propulsion system 10 has a battery-battery hybrid series configuration. The hybrid propulsion system 10 comprises a power generation system 12 that is operable to supply power to a traction drive system 14. In addition, the power generation system 12 comprises a first energy storage unit 16 that is coupled to the traction drive system 14 by a direct current (DC) link 18. The first energy storage unit is re-chargeable by an auxiliary power unit (APU) 20. During periods of regenerative braking, the first energy storage unit may also be partially recharged using the regenerative energy from the traction drive. The illustrated power generation system 12 also comprises a second energy storage unit 22 that is coupled to a DC link 19. In the illustrated embodiment, the energy storage units 16 and 22 are electrically re-chargeable batteries, wherein the first battery 16 has a higher energy density than the second battery 22 and is a source of energy to the traction drive system, 14. The second battery 22 may be a traction battery, which has a higher power density than the first battery 12 so that it can provide a surge of power to the traction drive system 14 for acceleration or heavy load conditions. The first battery 16 may be any of a variety of re-chargeable batteries, such as a lithium ion battery, a nickel metal-hydride battery, a sodium-sulfur battery, among others. The traction battery 22 may comprise a high specific power nickel-cadmium battery, nickel-metal hydride, or lead acid, among others. In a different embodiment, one or more of the energy storage units 16 and 22 may comprise an ultracapacitor. In yet another embodiment, the second energy storage unit 22 may comprise a flywheel.

The traction drive system 14 comprises at least one traction motor 24, rotationally coupled to a wheel 26 via a mechanical transmission drive (not shown). In this embodiment, the motor 24 is an alternating current (AC) motor. An inverter 28 is provided to invert the direct current on the DC link 18 to an alternating current for use by the motor 24. However, one skilled in the art will appreciate that a DC motor may also be used.

In the embodiment illustrated in FIG. 1, the APU 20 includes a heat engine 30. The heat engine 30 may comprise any engine that burns a fuel to produce mechanical work, such as a gasoline engine, a diesel engine, a gas turbine, etc. The heat engine 30 is rotationally coupled to an alternator 32, which converts the mechanical output of the heat engine 30 into AC power 34. The output of the alternator 32 is coupled to the DC link 18 by a rectifier 36. The rectifier 36 converts the AC output of the alternator into DC power.

Additionally, the illustrated power generation system 12 comprises a boost converter circuit 38 that increases the voltage provided by the high energy battery 16. The boost converter circuit 38 is controllable in a manner to regulate the amount of power drawn from the battery 16 to power the motor 24 and to charge the traction battery 22. A dynamic retarder 40, including an associated controller, is provided to control the voltage on the DC link 19 across the traction battery 22 to within acceptable levels above a normal operating voltage of the traction battery 22. Furthermore, the high energy battery 16 may be used to supply power to one or more auxiliary loads 42 across battery 16 terminals.

During normal operation, the traction drive system 14 is generally powered by the high-energy battery 16, wherein power flows along the DC links 18 and 19 in a direction represented by arrow 44 in FIG. 1. When acceleration is desired or the traction drive system 14 is under heavy load conditions, additional power is drawn from the traction battery 22 in a direction represented by arrow 46. During braking, a portion of the regenerative braking energy produced within the traction drive system 14 is transferred from the traction motor 24 to the traction battery 22. As a result, power flows from the traction motor 24 to the traction battery 22 in the direction represented by arrow 48. The remaining portion of the regenerative braking energy flows in the direction of arrow 49. The power from the traction motor 24 is used to partially re-charge the traction battery 22. As noted earlier, the APU 20 provides a flow of power to charge the battery 16, as represented by arrow 50. APU 20 also provides power flow, shown by arrow 51 to supply power to the traction drive 14 through the Boost Converter 38.

Control of the propulsion system 10 is accomplished by a vehicle system controller 52 and an APU control system 54 that limits the maximum power of the APU to rated power of the heat engine 30 and alternator 32. A sensor 58 is provided to detect the voltage across the high energy battery 16. The APU control system 54 is adapted to control operation of the APU 14 to charge the battery 16 based on the voltage across the high energy battery 16. For example, the APU control system 54 may be operable to regulate operation of the APU 20, such that a maximum value of the output DC voltage ($V_A$) of the APU 20 is within a maximum charge voltage of the high energy battery 16. Furthermore, the APU control system 54 may provide for compensation of the output voltage ($V_A$) of the APU 20 based on the temperature of the battery 16. The APU control system 54 may also comprise an on-board programmable logic controller (PLC).

Control of the traction battery 22 and associated DC link 19 of the traction drive 14 during acceleration or while operating in a cruise mode is performed by power supplied by an on-board energy source 55, comprised of the APU 20, high energy battery 16, and boost converter 38. For example, power from the on-board energy source 55 is adapted to regulate the voltage of the DC link 19 not to exceed a maximum value. The maximum value may also be compensated by the temperature of battery 22. During heavy accelerations, the maximum power limit of the on-board energy source 55 may be reached, and the value of the DC link 19 will decrease as additional power is drawn from the power battery to meet the power demand of the traction drive 14. During regenerative braking, the control of the dynamic retarder 40 prevents excessive voltage on the DC link 19.

Various control schemes may be used to control the operation of the APU 20. For example, the APU control system 54 may be directed to start the APU 20 when the system controller 52 receives an input 56 from an operator to energize the propulsion system 10. In one embodiment, the operator input means 56 may comprise a key-switch, such that the APU 20 is started whenever an operator sets the key switch in an "on" position. Once in operation, the heat engine 30 is operated at a predetermined speed to produce a desired output power within a maximum output voltage ($V_A$) limit, with minimal fuel consumption.

In a second control scheme, the APU 20 is not operated continuously. Instead, the APU control system 54 may stop the APU 20, or reduce the engine speed to a predetermined "fast-idle" when the output voltage ($V_A$) of the APU 20 is within a predetermined voltage range and the output phase current of the alternator 32 is lower than a predetermined current limit for a predetermined time. Accordingly, the system 10 may comprise voltage and current sensors for the APU 20, collectively represented by reference numeral 60 in FIG.

1. In an alternate control scheme, similar APU control may be accomplished based on measurement of the DC current output of the rectifier 36. The second APU control scheme provides a greater fuel economy for the heat engine 30 than the first control scheme, and provides for reduced emissions or zero emission of the vehicle during a limited period of operation.

In a third control scheme for the APU 20, the APU 20 is operated in a manner similar to that in the second control scheme, but the APU control system 54 directs the heat engine 30 to restart, or resume the predetermined speed of the heat engine 30 from the predetermined "fast-idle" speed upon receipt of a signal from the vehicle system controller 52. The signal may be provided in anticipation of a demand for the heat engine 30 to provide power to the system 10. Such a signal from the vehicle system controller 52 may be based on specific conditions. One example of such a condition is when the average power of the traction drive system 14 is above a predetermined value. Another example is when the vehicle is climbing a slope, and the instantaneous grade exceeds a predetermined value.

In a fourth control scheme for the APU 20, the APU 20 is operated in a manner similar to that in the second control scheme, but the APU control system 54 directs the heat engine 30 to restart, or resume, the predetermined speed of the heat engine 30 from the predetermined "fast-idle" speed upon receipt of a signal from the vehicle system controller 52 whenever a state of the energy storage capacity or state of charge of battery 22 falls below a particular value of the state of energy storage capacity or state of charge of battery 22. If the energy storage unit 22 is an ultracapacitor, the state of energy storage capacity is typically determined by the voltage of the ultracapacitor. If the energy storage unit 22 is a flywheel, the state of energy storage capacity is typically determined by the rotational speed of the flywheel. In the case where the energy storage unit is a battery, the state of charge is based on integration of the net ampere-hours from battery 22.

Furthermore, the APU control may have a governor (not shown) that limits a maximum power that the heat engine 30 will produce. The governor allows the heat engine 30 to produce the rated power, over a range of engine speeds, even during transient loads from the alternator 32. This feature prevents stalling of the heat engine 30 and operation of the heat engine within a maximum design speed range. Governing the engine speed in an APU 20 with a permanent magnet alternator is one method to prevent overvoltage of the alternator 32.

The battery-battery series hybrid configuration, utilizing an APU, is advantageous over conventional series hybrid configurations known in the art for several reasons. First, in conventional series hybrid configurations having a heat engine and a traction battery, voltage across the traction battery can fluctuate typically between 75% of a nominal value during acceleration to about 110% of the nominal value during regenerative braking. The present configuration reduces the fluctuations on the traction battery 22 by the use of the high-energy battery 16, which provides load leveling for the heat engine 30. Further, since the APU control 54 provides for intermittent operation of the heat engine 30, an engine of a relatively lower power rating can be used for a given heavy-duty application, than in a conventional series hybrid system. As discussed below, different embodiments of an APU 20 can be used in a battery-battery series hybrid configuration.

Figure 2:
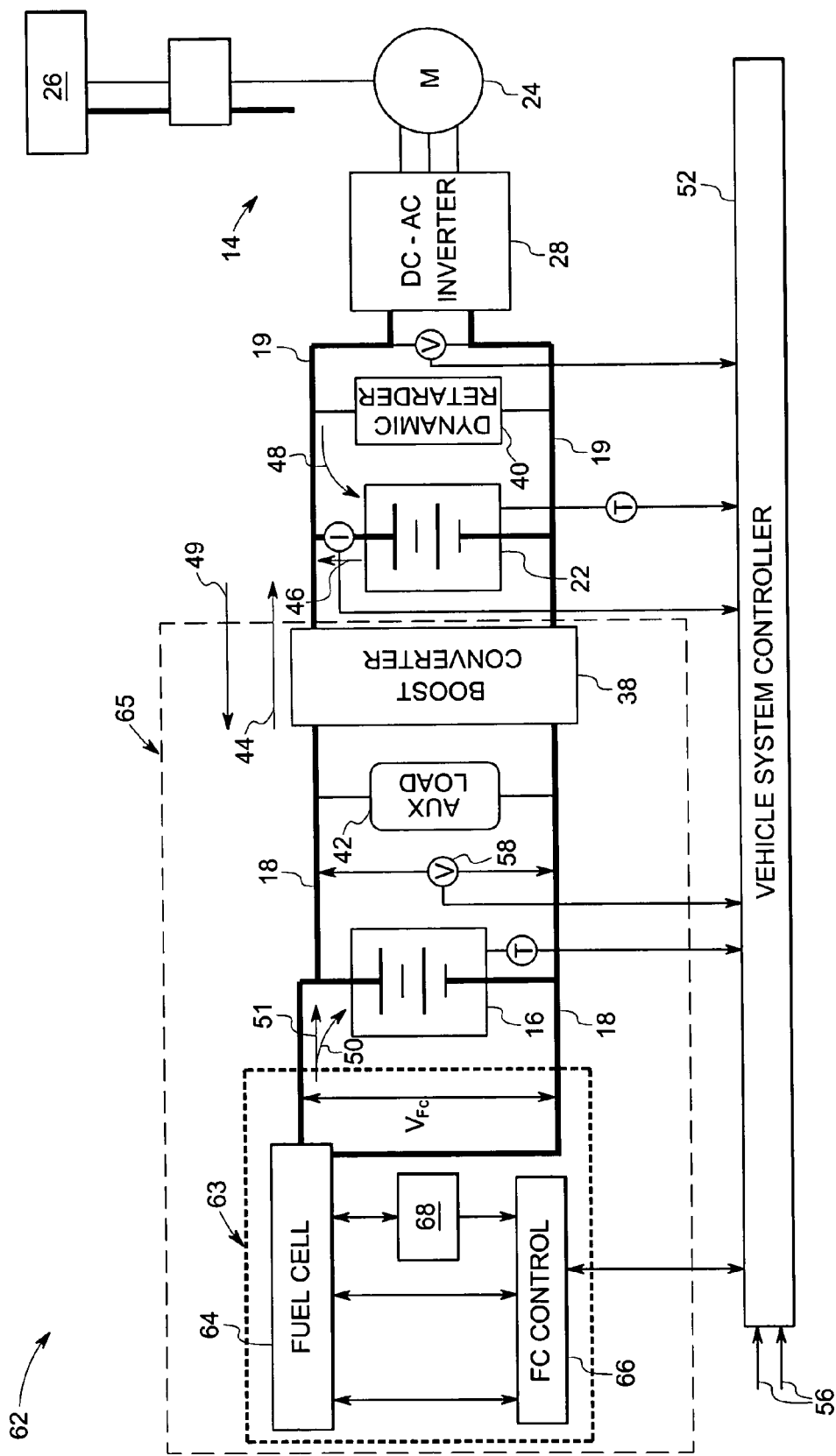
FIG. 2 is an electrical schematic of an alternative embodiment of a hybrid propulsion system, in accordance with an exemplary embodiment of the present technique.

FIG. 2 illustrates an alternative embodiment of a battery-battery series hybrid propulsion system, as referenced generally by reference numeral 62. In the illustrated embodiment, an auxiliary power unit (APU) 63 comprises a fuel cell 64, rather than a heat engine 30. The fuel cell 64 may comprise a plurality of fuel cell units coupled together. The fuel cell 64 is operable to produce a DC power output, which can be utilized to charge the energy storage unit 16 via the DC link 18. Similar to the system 10 illustrated in FIG. 1, control of the energy storage unit 22 and associated DC link 19 of the traction drive 14 during acceleration or while operating in a cruise mode is performed by power supplied by an on-board energy source 65, comprised of the APU 63, the high energy battery 16, and the boost converter 38. It in the illustrated embodiment, energy storage unit 16 is an electrically rechargeable battery, and energy storage unit 22 is a traction battery.

The system 62 further comprises a fuel cell control system 66, which is functionally similar to the APU control system 54 in FIG. 1. Particularly, the fuel cell control system 66 may be operable to regulate operation of the fuel cell 64, such that the output DC voltage ($V_{FC}$) of the fuel cell 64 is within a maximum charge voltage of the battery 16. The fuel cell 64 may be controlled in a similar manner to the heat engine 30 described above.

For example, in a first control scheme the fuel cell 64 may be operated continuously while the vehicle is operating to maintain the high energy battery 16 charged. The size of the fuel cell 64 is selected to enable the fuel cell 64 to operate continuously with minimal specific fuel consumption (SFC).

In a second control scheme, the fuel cell 64 is discontinues charging the high energy battery 16 when the output voltage ($V_{FC}$) of the fuel cell 64 is within a predetermined voltage range limit and the output phase current of the fuel cell 64 is lower than a predetermined current limit for a predetermined time. The fuel cell 64 may resume charging the high energy battery 16 when the voltage across the high energy battery 16 drops below a desired voltage for a defined period of time Further, the fuel cell control system 66 may limit the maximum power that the fuel cell 64 produces. This fuel cell control function allows the fuel cell to produce rated power, over a range of fuel cell operation, even during transient loads from the high energy battery 16. This feature prevents overloading and ensures operation of the fuel cell within a maximum design output voltage and power range.

The system 62 has substantially similar advantages over conventional series hybrid propulsion systems as the system 10 illustrated in FIG. 1. However, it may be noted that the present techniques are not limited to a battery-battery series hybrid configuration. They can implement in a conventional series hybrid configuration as well as discussed below.

Figure 3:
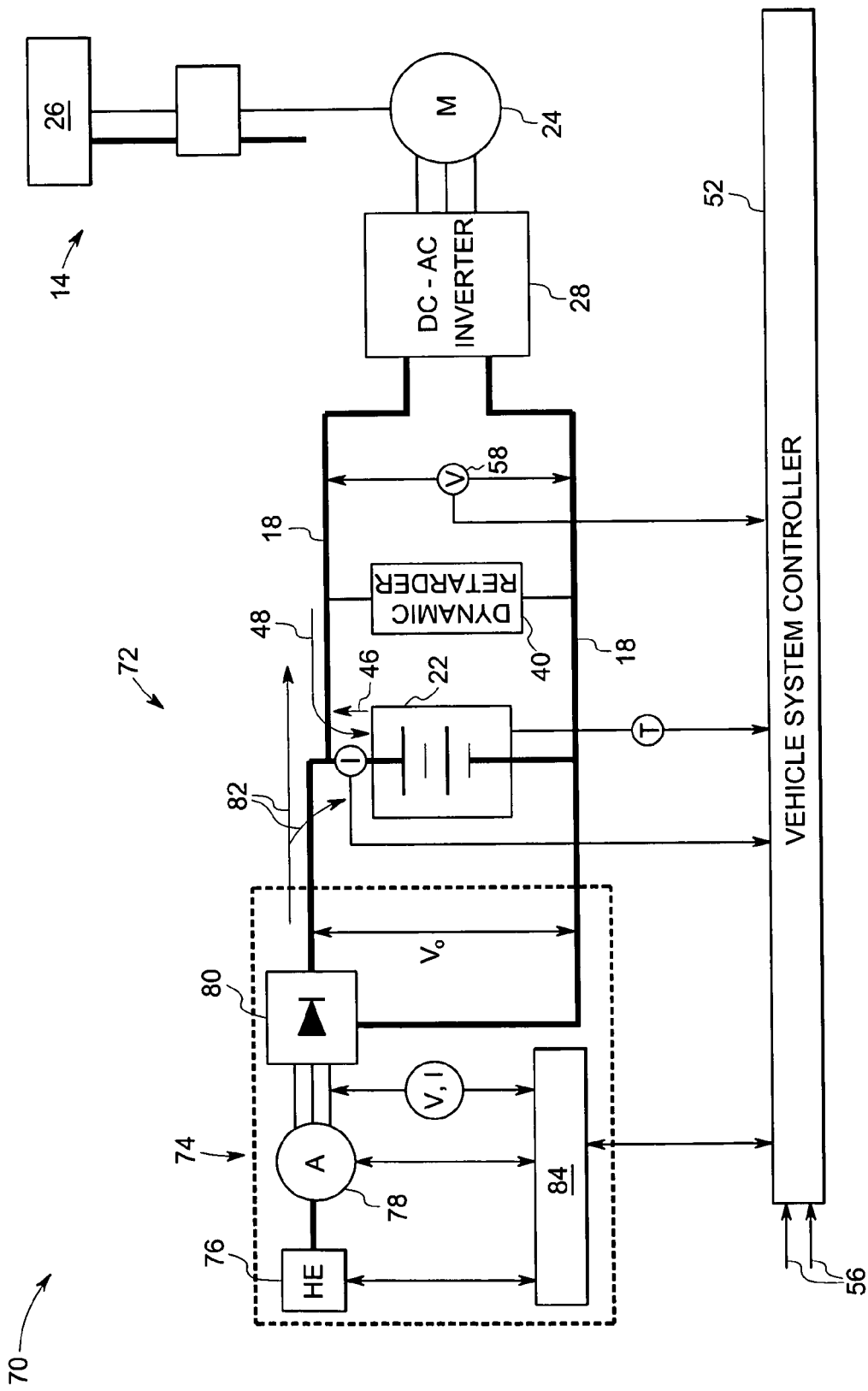
FIG. 3 is an electrical schematic of a second alternative embodiment of a hybrid propulsion system, in accordance with an exemplary embodiment of the present technique.

FIG. 3 illustrates a hybrid propulsion system 70 comprising a power generation system 72 and a traction drive system 14, wherein the power generation system comprises an on-board energy source 74, and an energy storage unit 22, typically a traction battery having a high power density. In operation, the traction drive system 14 is powered by the on-board energy source 74. The on-board energy source 74 may comprise a heat-engine 76 coupled to an alternator 78 with an associated rectifier 80, operable in a manner similar to that of the propulsion system 10 illustrated in FIG. 1.

During acceleration or heavy load conditions, power is drawn from the traction battery 22 to supplement the power from the on-board energy source 74. During a braking operation, regenerative power is transferred to the traction battery 22 from the traction drive 14, comprised of DC-AC inverter 28 and motor 24. The on-board energy source 74 is operable to charge the battery 22. The power flowing from the on-board energy source 74 is represented by arrows generally designated by the numeral 82.

The system 70 has a control system 84 that is operable in manner similar to the APU control system 54 of FIG. 1, the difference being that the control system 84 regulates the operation of the on-board energy source 74 to maintain a desired voltage across the traction battery 22. In particular, the control system 84 may be operable to regulate operation of the on-board energy source, such that a maximum value of an output DC voltage ($V_O$) of the on-board energy source 74 is within a maximum charge voltage of the traction battery 22. The control system 84 may utilize the various control schemes described above to maintain the desired voltage across the traction battery.

The techniques described above advantageously allow simple local or self-regulation of the fuel operated APU or on-board energy source, which in turn provides a high degree of reliability and minimal specific fuel consumption, (SFC). As mentioned earlier, an intermittent operation of the fuel operated APU also leads to reduced noise level and minimal emission.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A hybrid propulsion system, comprising:
a first DC link;
a first energy storage unit coupled across the first DC link and operable to supply power to operate at least one traction drive motor;
a second DC link coupled electrically downstream of the first DC link;
a second energy storage unit coupled across the second DC link and electrically coupled to the traction drive motor;
a conversion circuit coupled between the first and second DC links and configured to cause a different voltage level on the first and second DC links;
an auxiliary power unit coupled to the first DC link and operable to charge the first energy storage unit; and
a control system operable to control operation of the auxiliary power unit to maintain a desired voltage across the first DC link and to control power flow through conversion circuit;
wherein the first energy storage unit and the first DC link are only coupled to the traction motor through the second DC link.

2. The system as recited in claim 1, wherein the first energy storage unit has a higher energy density and a lower power density than the second energy storage unit.

3. The system as recited in claim 1, wherein the first energy storage unit comprises a battery.

4. The system as recited in claim 1, wherein the second energy storage unit comprises a traction battery.

5. The system as recited in claim 1, wherein the first energy storage unit comprises an ultracapacitor.

6. The system as recited in claim 1, wherein the second energy storage unit comprises an ultracapacitor.

7. The system as recited in claim 1, wherein the second energy storage unit comprises at least one of a flywheel and an engine coupled to an alternator.

8. The system as recited in claim 1, wherein the auxiliary power unit comprises a fuel cell.

9. The system as recited in claim 1, wherein the control system compensates for the temperature of the first energy storage unit when operating the auxiliary power unit to maintain a desired voltage across the DC link.

10. The system as recited in claim 1, wherein the control system is operable to start the auxiliary power unit whenever the system is energized.

11. The system as recited in claim 1, wherein the control system is operable to stop operation of the auxiliary power unit when output voltage of the auxiliary power unit is within a predetermined voltage range limit and an output current of the auxiliary power unit is lower than a predetermined current limit for a predetermined time.

12. The system as recited in claim 11, wherein the control system is operable to restart operation of the auxiliary power unit upon receipt of a signal from a system controller.

13. The system as recited in claim 12, wherein the control system is operable to restart operation of the auxiliary power unit when a state of energy storage capacity of the second energy storage unit is below a particular value of the state of energy storage capacity.

14. The system as recited in claim 13, wherein the second energy storage unit comprises an ultracapacitor, and the state of energy storage capacity is based on voltage across the ultracapacitor.

15. The system as recited in claim 13, wherein the second energy storage unit comprises a battery, and the state of energy storage capacity is based on an integration of net ampere-hours from the battery.

16. The system as recited in claim 13, wherein second energy storage unit comprises a flywheel, and the state of energy storage capacity is based on a rotational speed of the flywheel.

17. The system of claim 1, wherein the conversion circuit is configured to transfer power bi-directionally between the first DC link and the second DC link.

18. The system of claim 17, wherein the conversion circuit boosts voltage from the first DC link to a higher level for application to the second DC link during power flow from the first DC link to the second DC link.

19. The system of claim 18, wherein the conversion circuit reduces voltage from the second DC link to the first DC link during power flow from the second DC link to the first DC link.

20. A hybrid propulsion system, comprising:
a first DC link;
a first energy storage unit coupled across the first DC link;
a second DC link;
a second energy storage unit coupled across the second DC link and to at least one propulsion motor;
a conversion circuit coupled between the first DC link and the second DC link and configured to convert power from the first DC link at a first voltage to power at a different voltage for application to the second DC link;
an on-board energy source including an engine and an alternator operable to supply power the first DC link to charge the first energy storage unit; and
a control system operable to control operation of the on-board energy source to maintain a desired voltage across the first DC link and to control power flow through the conversion circuit, the control system controlling operation of the on-board energy source based upon a rating of the engine and the alternator;
wherein the first energy storage unit and the first DC link are only coupled to the propulsion motor through the second DC link.

21. The system as recited in claim 20, wherein the control system is operable to reduce power supplied from the on-board energy source to the first energy storage unit when an output voltage of the on-board energy source is within a predetermined voltage range limit and an output current of the on-board energy source is lower than a predetermined current limit for a predetermined time.

22. The system as recited in claim 21, wherein the control system is further operable to increase power supplied from the on-board energy source to the first energy storage unit upon receipt of a signal from a system controller.

23. The system as recited in claim 20 wherein the on-board energy source comprises a fuel cell.

24. The system as recited in claim 20, wherein the first energy storage unit is selected from the group consisting of: a battery, an ultracapacitor, a flywheel, or any combinations thereof.

25. The system of claim 20, wherein the conversion circuit is configured to transfer power bi-directionally between the first DC link and the second DC link.

26. The system of claim 25, wherein the conversion circuit boosts voltage from the first DC link to a higher level for application to the second DC link during power flow from the first DC link to the second DC link.

27. A method for operating a heavy duty hybrid propulsion system, comprising:
operating a first energy storage unit across a first DC link;
operating a second energy storage unit across a second DC link to supply power to at least one drive motor;
operating a conversion circuit to convert voltage from the first DC link to a different voltage for application to the second DC link to transfer energy from the first energy storage unit to the second energy storage unit, and to control power flow through the conversion circuit; and
operating an auxiliary power unit including an engine and an alternator operable to charge the first energy storage unit to maintain a desired voltage across the first DC link;
wherein the first energy storage unit and the first DC link are only coupled to the drive motor through the second DC link.

28. The method of claim 27, wherein operating the auxiliary power unit comprises operating an engine and alternator of the auxiliary power unit based upon a rating of the engine and the alternator.

29. The method of claim 28, wherein operating the auxiliary power unit comprises operating a fuel cell.

30. The method of claim 27, wherein operating the auxiliary power unit to maintain a desired voltage comprises compensating for the temperature of the second energy storage unit.

31. The method claim 27, comprising operating the auxiliary power unit whenever the propulsion system is enabled by an operator.

32. A method for operating a heavy duty hybrid propulsion system, comprising:
operating an on-board power generation system including an engine and an alternator to supply power to charge a first energy storage unit coupled across a first DC link;
operating a second energy storage unit coupled across a second DC link to operate at least one propulsion drive motor;
operating a conversion circuit coupled between the first and second DC links to provide power from the first DC link at a first voltage to the second DC link at a second, different voltage and to control power flow through the conversion circuit, the second energy storage unit providing additional power on demand to the at least one propulsion drive motor; and
controlling the operation of the on-board power generation system to maintain a desired voltage across the first DC link, wherein the on-board power generation system is operated based upon a rating of the engine and the alternator;
wherein the first energy storage unit and the first DC link are only coupled to the propulsion drive motor through the second DC link.

33. The method of claim 32, wherein operating the on-board power generation system comprises operating the engine continuously.

34. The method of claim 33, wherein operating the on-board power generation system comprises reducing power from the engine when the voltage across the first DC link is within a predetermined voltage range and an output phase current of the on-board energy source is lower than a predetermined current limit for a predetermined time.

* * * * *